(12) United States Patent
Hinojosa Munoz (10) Patent No.: US 11,555,126 B2
(45) Date of Patent: Jan. 17, 2023

(54) ACIDIC BIODEGRADABLE FORMULATION AND ITS USE AS A SURFACE RESTORATIVE AGENT

(71) Applicant: Gilberto Hinojosa Munoz, Nuevo Leon (MX)

(72) Inventor: Gilberto Hinojosa Munoz, Nuevo Leon (MX)

(*) Notice: Subject to any disclaimer, the term of this patent is extended or adjusted under 35 U.S.C. 154(b) by 180 days.

(21) Appl. No.: 16/854,004

(22) Filed: Apr. 21, 2020

(65) Prior Publication Data

US 2021/0269655 A1 Sep. 2, 2021

(30) Foreign Application Priority Data

Feb. 28, 2020 (MX) .................. MX/a/2020/002328

(51) Int. Cl.
| | | |
|---|---|---|
| *C11D 1/72* | (2006.01) | |
| *C09D 5/12* | (2006.01) | |
| *C09D 5/08* | (2006.01) | |
| *C09D 5/02* | (2006.01) | |
| *C11D 3/22* | (2006.01) | |
| *C11D 3/00* | (2006.01) | |
| *C11D 3/04* | (2006.01) | |
| *C11D 3/20* | (2006.01) | |
| *C09D 7/63* | (2018.01) | |

(52) U.S. Cl.
CPC .............. *C09D 5/12* (2013.01); *C09D 5/028* (2013.01); *C09D 5/086* (2013.01); *C09D 7/63* (2018.01); *C11D 3/0073* (2013.01); *C11D 3/042* (2013.01); *C11D 3/2068* (2013.01); *C11D 3/222* (2013.01)

(58) Field of Classification Search
CPC ......... C11D 1/72; C11D 3/0094; C11D 3/042; C11D 7/08; C11D 7/263; C11D 11/0023
See application file for complete search history.

(56) References Cited

U.S. PATENT DOCUMENTS 5,733,377 A * 3/1998 Howe .................. C11D 7/5013
134/40
2017/0203315 A1 7/2017 Ivey

FOREIGN PATENT DOCUMENTS

| CN | 204583543 | 8/2015 |
|---|---|---|
| EP | 1074311 | 2/2001 |
| RO | 132714 | 7/2018 |
| WO | WO02066400 | 8/2002 |
| WO | WO2013090755 | 6/2013 |
| WO | WO2018067859 | 4/2018 |
| WO | WO2019112542 | 6/2019 |

* cited by examiner

*Primary Examiner* — Charles I Boyer
(74) *Attorney, Agent, or Firm* — Defillo & Associates, Inc; Evelyn A. Defillo (57) ABSTRACT

The present invention provides a biodegradable formulation and its use as a surfaces restoring agent, said formulation allows a substantial savings when restoring the existing paint on different surfaces, since it mainly cleans and restores the surface or paint contaminated by the environment, damaged due to the sun and the processes of the different industries, in addition to being friendly to the environment, making it a useful technology in any industrial branch that involves cleaning and restoring large areas. It is worth noting that the modifications to the original formula were made to optimize the results in the different applications and improve its biodegradability.

5 Claims, 11 Drawing Sheets

ACIDIC BIODEGRADABLE FORMULATION AND ITS USE AS A SURFACE RESTORATIVE AGENT

OBJECT OF THE INVENTION

The object of the present invention is to provide a biodegradable formulation and it's use as a surface restoring agent, said formulation allows substantial savings at the time of restoring existing paint in different surfaces, as mainly to clean and restore surface or paint contaminated by the environment, damaged by the sun and by the processes of the different industries, in addition to being friendly to the environment, making it a useful technology in any industrial branch that involves cleaning and restoring large surfaces.

BACKGROUND

Within the state of the art, various technologies have been detailed that have been developed to reduce the damage caused by the passage of time, as well as to eliminate residues and/or corrosion on industrial surfaces, mainly metallics, for various types of applications.

One of these technologies is described in document WO2019112542A1, which relates to a formulation in three variants, in which two variants of the formulation contain epoxy resin (polyester or vinyl ester) as the base, iron powder and carbonyl radiotechnical iron as filler, and dibenzoyl peroxide as hardener, in different proportions of components. The third formulation contains an acrylic resin as the base, a filler in the form of radio technical carbonyl iron and a hardener for the acrylic resin. Depending on the degree of damage to the metal surface of a vehicle body, the proposed formulations can be used in the described sequence or individually; the use of the proposed formulations allows to obtain a coating for a damaged surface: eliminating obvious defects, irregularities, dents and weld seams, minor irregularities and scratches, filling small cavities, minor irregularities and smoothing out irregularities on a prepared surface before applying a coat of paint. After performing repair and renovation work (filling, priming, painting, lacquering), the metal surface of a motor vehicle, verified with a depth gauge, becomes as close as possible to the factory standards for the depth of the coating of paint.

In the same way, document WO2018067859A1 provides a protective coating composition for the temporary protection of a spray paint booth where the compositions comprise an aqueous liquid that when applied to a surface of said paint booth dries to form a drop down white film thereon, where said liquid coating comprises a former liquid film which when applied to a surface and dries forms a drop down film, where former said liquid film comprises a polyvinylbutyral (PVB) and a pigment wherein said pigment comprises a rutile titanium dioxide sulfate process and where the protective coating composition is more resistant to yellowing than the same composition when formulated with a titanium dioxide chloride process.

Another technology included in document RO132714A0, refers to a composition used for the restoration of paint surfaces affected by the formation of metallic soap, and a process to prepare and apply it. According to the invention, the composition consists of 0.6-1.18% of Ca (NO) x4HO, 0.66-0.78% of (NH) HPO, 98-98.9% of faujasite in fine powder with particles of 0.053-0.1 μm, deionized water, and NHOH, to adjust the pH value to 9-10. Its process consists of mixing the components in aqueous solution and adding the faujasite powder at the temperature of 40° C., stirring the mixture for 1.5 h, while maintaining the pH at a value of 9-10 by means of a mixture of ammonium hydroxide, to result in a precipitate which, after filtration, washing and drying, is ground to a size of 74-80 μm, and the resulting powder is placed in cloth bags in amounts of 10 g per each one. The application process consists of applying the composition thus packaged on the paint layer affected by the metallic soap and keeping it for 30 minutes.

Likewise, the technology contained in the Chinese document CN204583543U, presents a utility model that refers to a metal surface restoring agent with a preparation spraying device that includes a base, which includes a mixed cavity in case of depositing various amounts of sap, also provides three feed stores: feed warehouse A that is connected to feed warehouse B and feed store C in the same mixing cavity, everything is provided with a measuring device in said feed warehouse A, feed warehouse B and the feed store C, the middle part of the lower surface of the base is provided with a motor A; a stirring rod A is powered by a motor and is provided with a feeding tube to deposit in the sap cavity on the upper surface of the left side, it is also provided with the pump on the inner right flank of the sap cavity. It also includes a configuration with a nozzle to take a hose, making its implementation convenient for your application. It has a simple structure and low costs.

Another technology is described in WO2013090755A1, which provides a cleaning formulation and method that uses a polysiloxane for superior cleaning and to create a protective coating with "easy-to-clean" properties on many types of surfaces, including metals, paints marine and gel coated surfaces; cleaning and protecting them from the effects of all kinds of accretions, including the most pernicious diesel exhaust soot. The polysiloxane is used with a solvent cyclomethicone, preferably pentacyclomethicone and/or hexacyclomethicone. The preferred method of application is by direct contact and application of the cleaning formulation to the treated surface through a microfiber cloth wrapped around a firm rubber blade or the like.

The American Application US2017203315A1 provides a system for the restoration of metallic surfaces that includes: a liquid solution, where the liquid solution includes a mixture of water, resin, polymer, liquid wax, plasticizer, mold remover and a sealant; a container, where the container contains the liquid solution during use; and a manual spray attached to the container, where the manual spray allows the application of the liquid solution on a metal surface. The system preferably includes a hose, where the hose connects the manual spray to the container. Manual spraying can also include a nozzle and a trigger, where the user presses the trigger to release the liquid solution out of the nozzle. Similarly, WO02066400A1 is directed to a surface restoration composition that includes an organic acid, a metal oxide, and a plasticizer. Optionally, dispersants, thickeners and water can be included in the composition, which is applied to a stone surface and polished to dryness to achieve the desired level of shine. European Document EP1074311A1 refers to a method for cleaning structural surfaces by applying a film-forming liquid on the surface and removing said film with the constituents to be removed, in which the surface to be cleaned is treated with an aqueous dispersion of elastomeric polymer and by removing the elastomer, a film is obtained that remains after the treated surface has dried.

It should be noted that although these technologies comprise devices or formulations for the restoration of surfaces, they do not have the same composition of the present invention, they are not biodegradable and they do not have the same cleaning and restoration results after their application.

DETAILED DESCRIPTION OF THE INVENTION

The present invention comprises a biodegradable formulation that is used on surfaces, preferably industrial, shown in FIG. 1, FIG. 3, FIG. 5 and FIG. 7, which usually show damage due to being exposed to the outside and in contact with inclement weather, in addition to having traces of industrial materials such as oils and other residues, which cause these surfaces to present an appearance of neglect and dirt.

The present invention, unlike the existing products on the market that promise to clean these types of surfaces, does not damage or eliminate the shine of metallic structures, avoiding the yellowish color that can appear in the long term with said formulations, thus, the present invention cleans, decontaminates, and restores, maintaining the original shine of the structures, as shown in FIG. 2, FIG. 4, FIG. 6 and FIG. 8, in addition to being non-toxic to the user who applies it.

Figure 1:
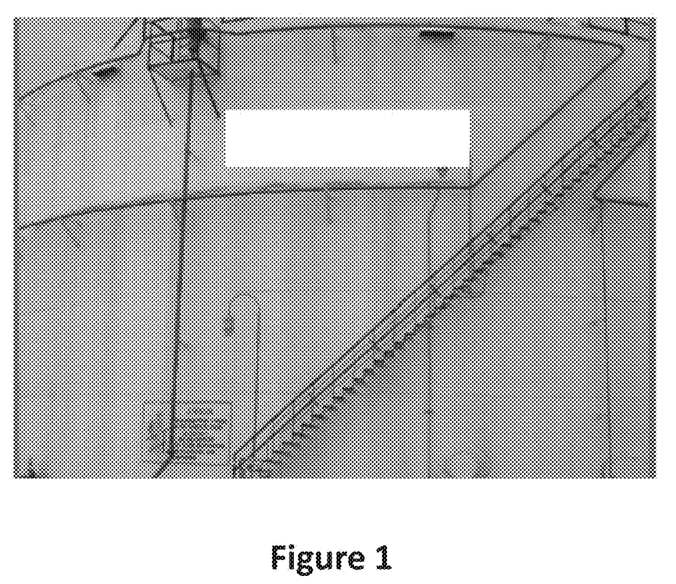
FIG. 1. Shows a photograph with a front view of a metallic surface prior to the application of the formulation object of the present invention.
Figure 2:
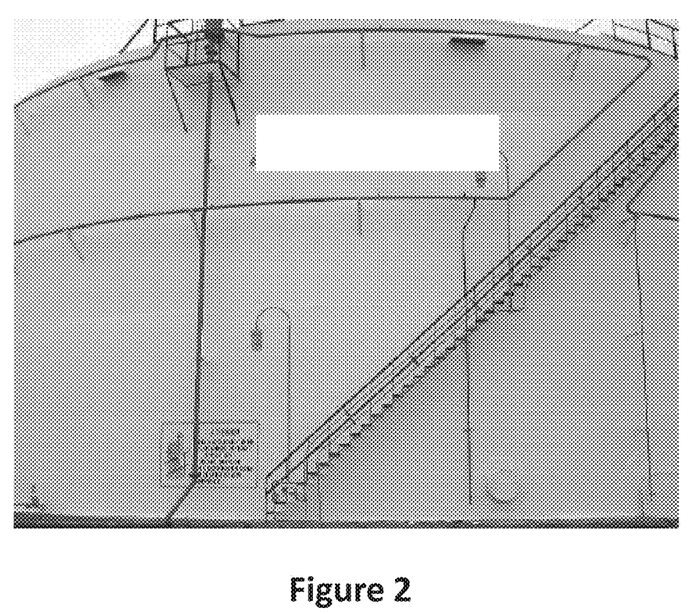
FIG. 2. Shows a photograph with a front view of a metallic surface after the application of the formulation object of the present invention.
Figure 3:
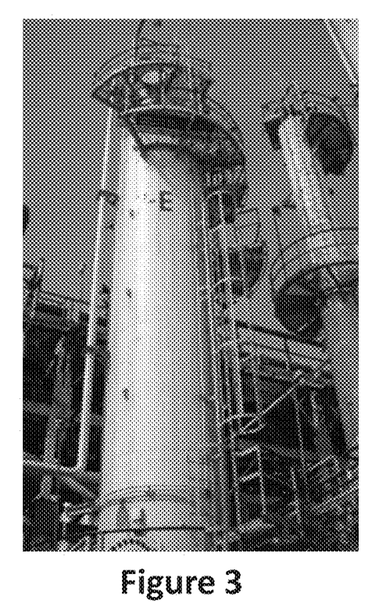
FIG. 3. Shows a photograph with a front view of a metal structure prior to the application of the formulation object of the present invention.
Figure 4:
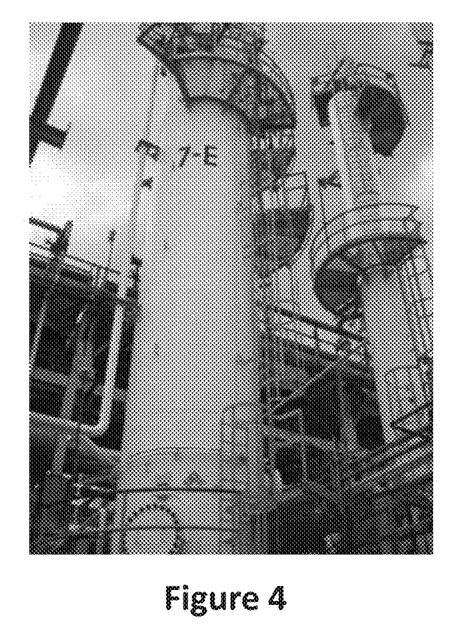
FIG. 4. Shows a photograph with a front view of a metallic structure after the application of the formulation object of the present invention.
Figure 5:
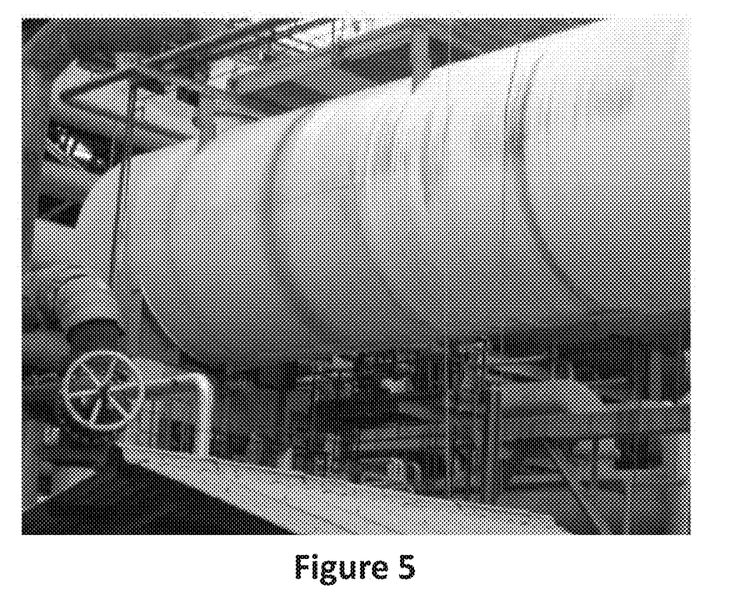
FIG. 5. Shows a photograph with an isometric view of a metal tank prior to the application of the formulation object of the present invention.
Figure 6:
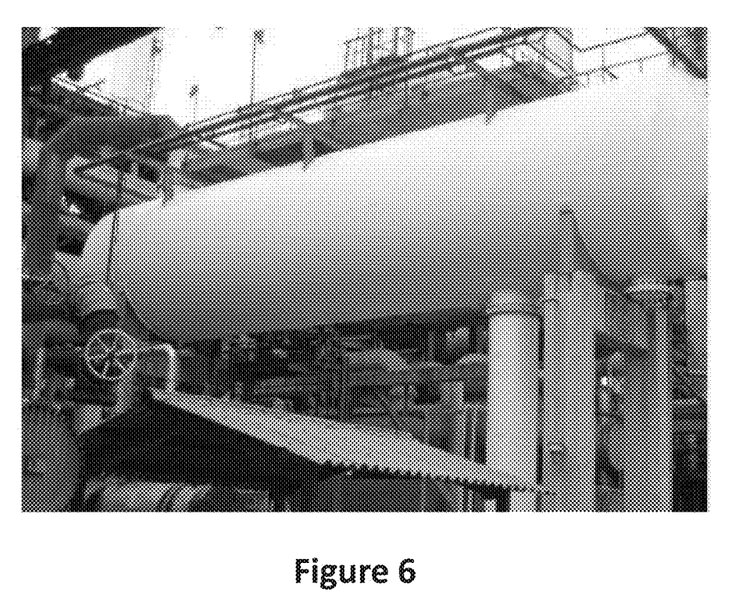
FIG. 6. Shows a photograph with an isometric view of a metallic tank after the application of the formulation object of the present invention.
Figure 7:
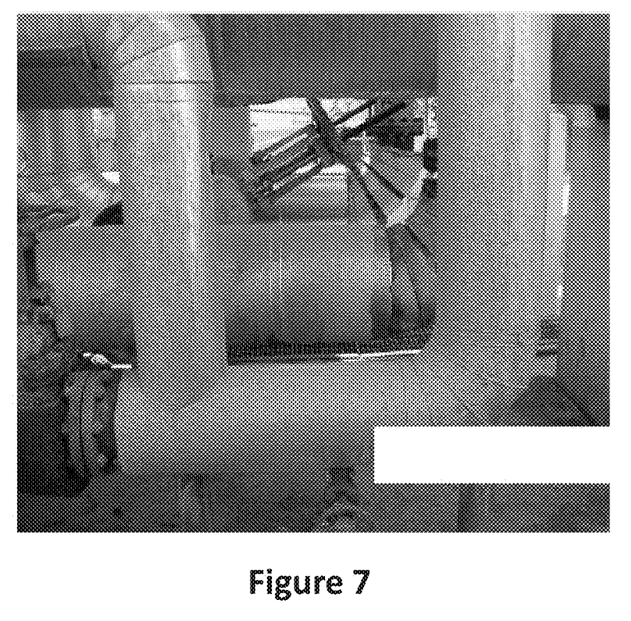
FIG. 7. Shows a photograph with a side view of a metallic pipe prior to the application of the formulation object of the present invention.
Figure 8:
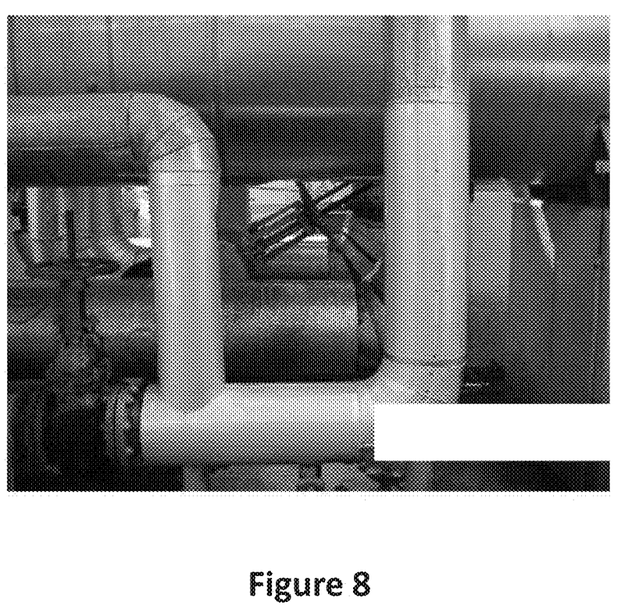
FIG. 8. Shows a photograph with a side view of a metallic pipe after the application of the formulation object of the present invention.
Figure 9:
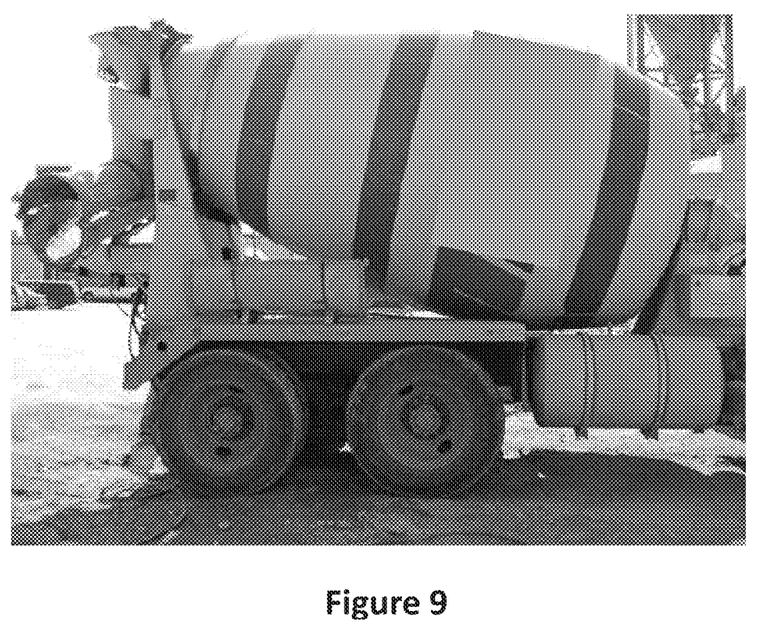
FIG. 9. Shows a photograph with a side view of a vehicle used in the construction industry prior to the application of the formulation object of the present invention.
Figure 10:
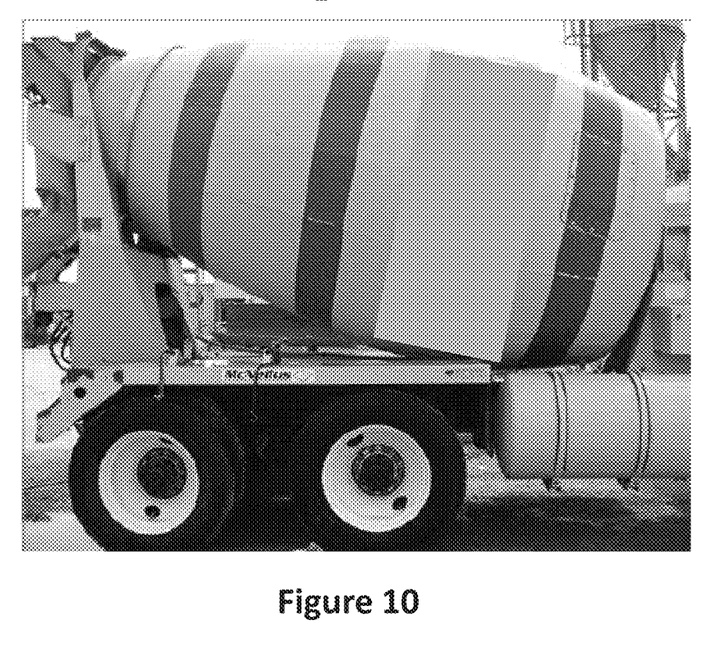
FIG. 10. Shows a photograph with a side view of a vehicle used in the construction industry after the application of the formulation object of the present invention.
Figure 11:
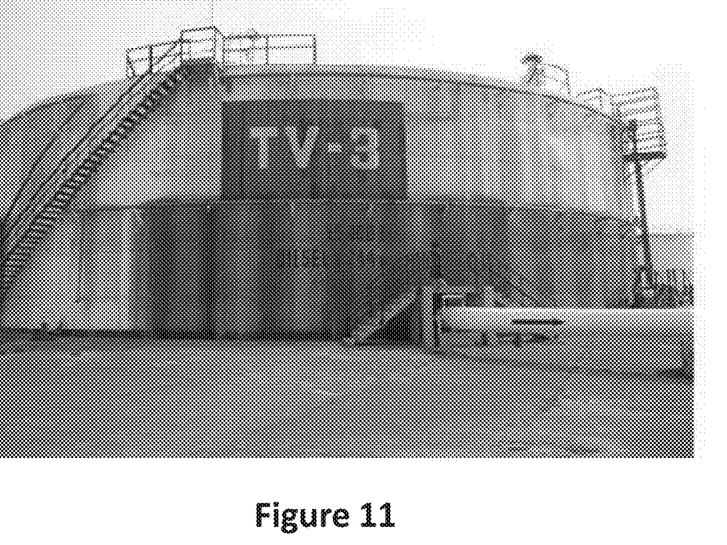
FIG. 11. Shows a photograph with a front view of a metallic industrial container prior to the application of the formulation object of the present invention.
Figure 12:
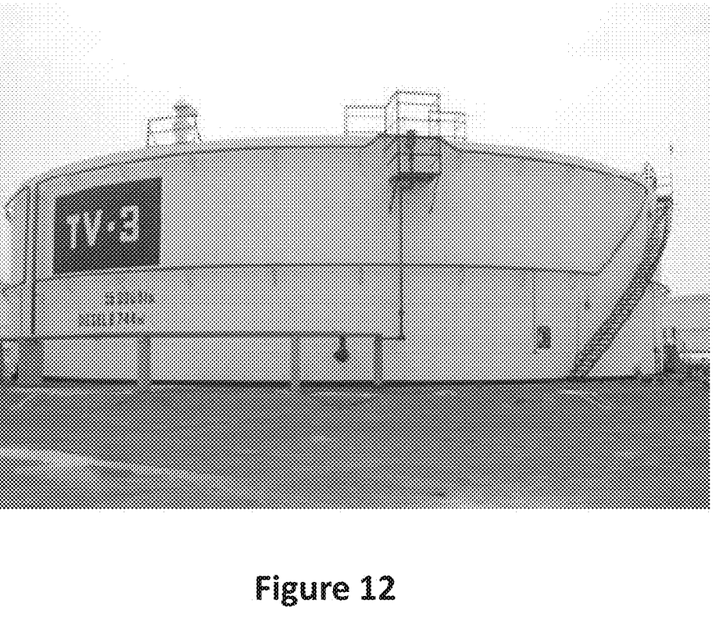
FIG. 12. Shows a photograph with a front view of a metallic industrial container after the application of the formulation object of the present invention.
Figure 13:
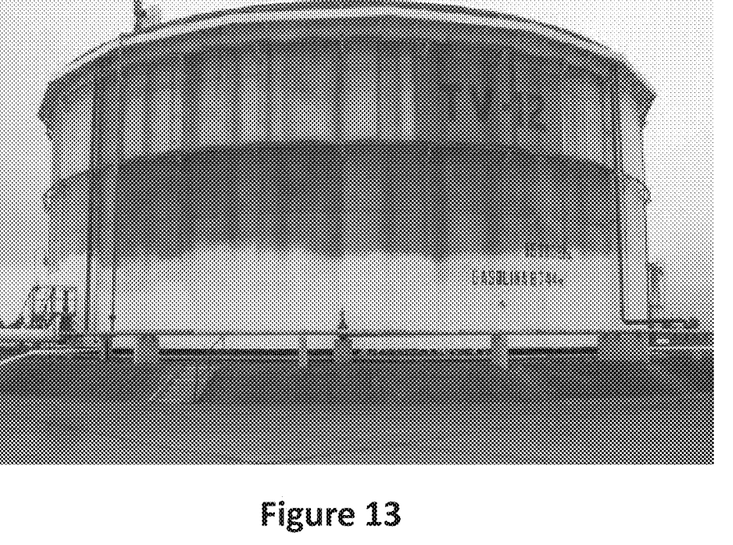
FIG. 13. Shows a photograph with a front view of a metallic industrial container prior to the application of the formulation object of the present invention.
Figure 14:
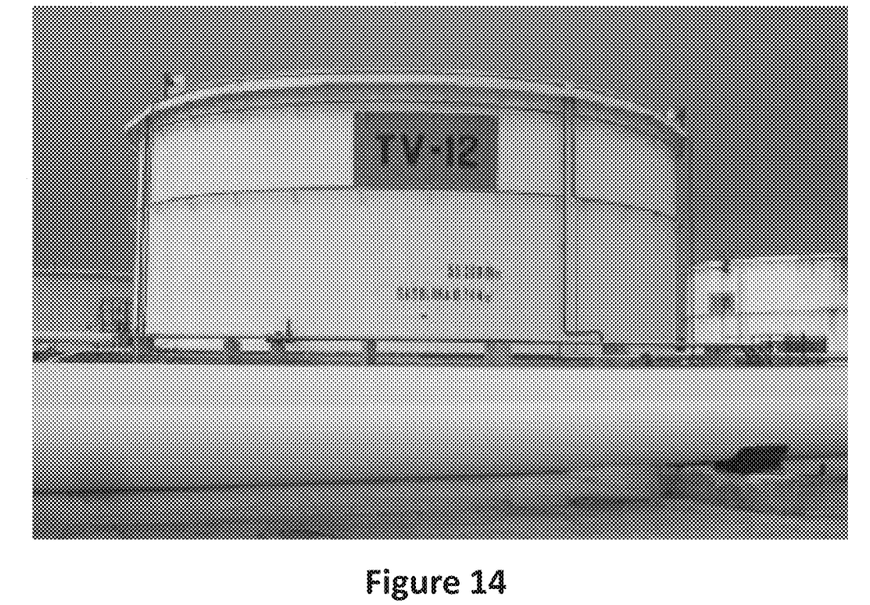
FIG. 14. Shows a photograph with a front view of a metallic industrial container after the application of the formulation object of the present invention.
Figure 15:
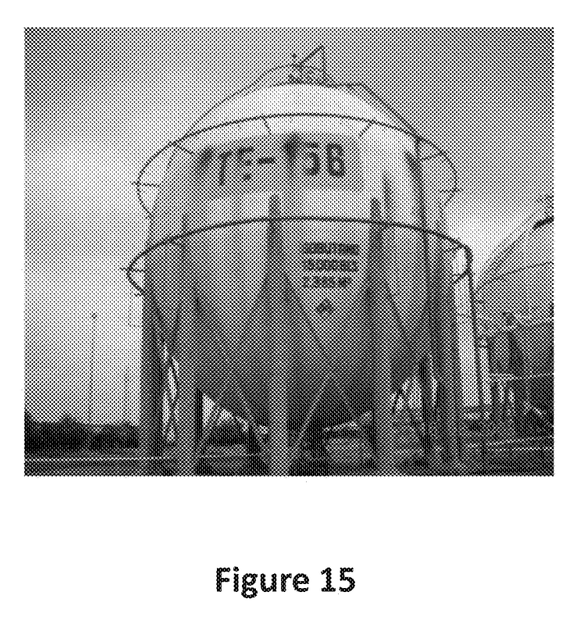
FIG. 15. Shows a photograph with a front view of a metallic industrial container prior to the application of the formulation object of the present invention.
Figure 16:
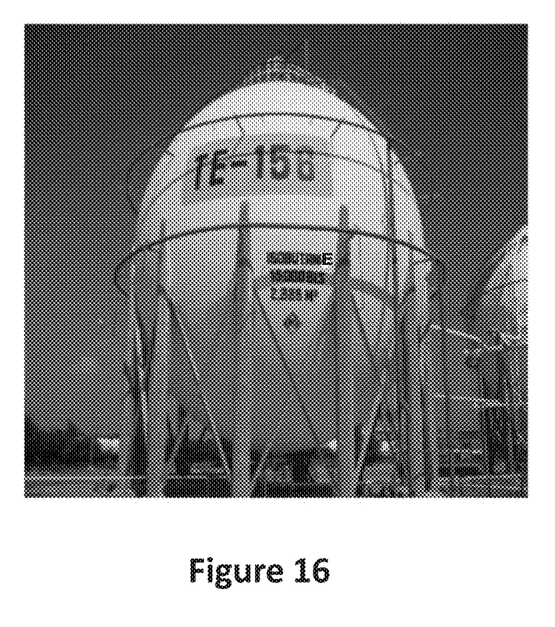
FIG. 16. Shows a photograph with a front view of a metallic industrial container after the application of the formulation object of the present invention.
Figure 17:
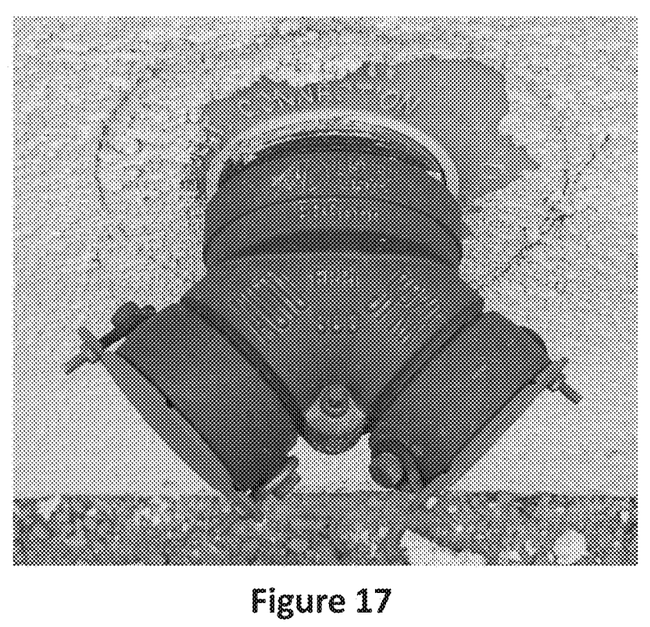
FIG. 17. Shows a photograph with a top view of a copper outlet prior to the application of the formulation object of the present invention.
Figure 18:
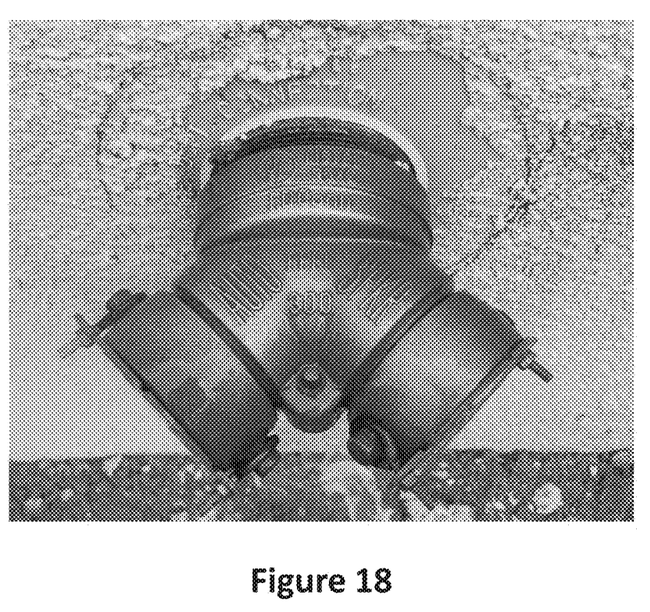
FIG. 18. Shows a photograph with a top view of a copper outlet after the application of the formulation object of the present invention.
Figure 19:
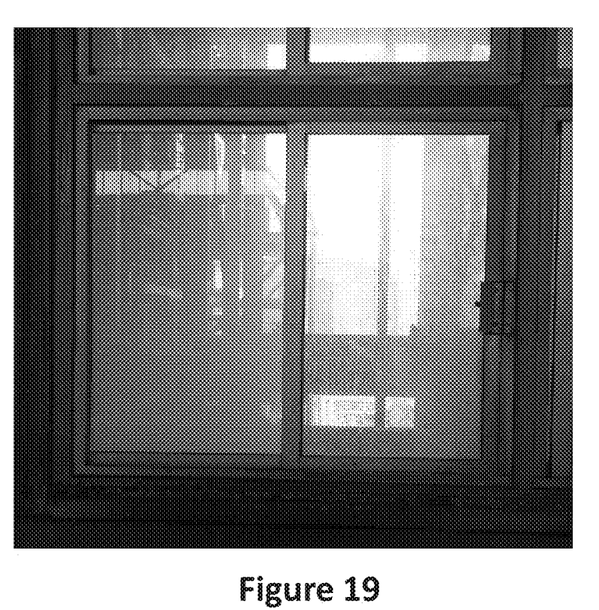
FIG. 19. Shows a photograph with a front view of a glass window prior to the application of the formulation object of the present invention.
Figure 20:
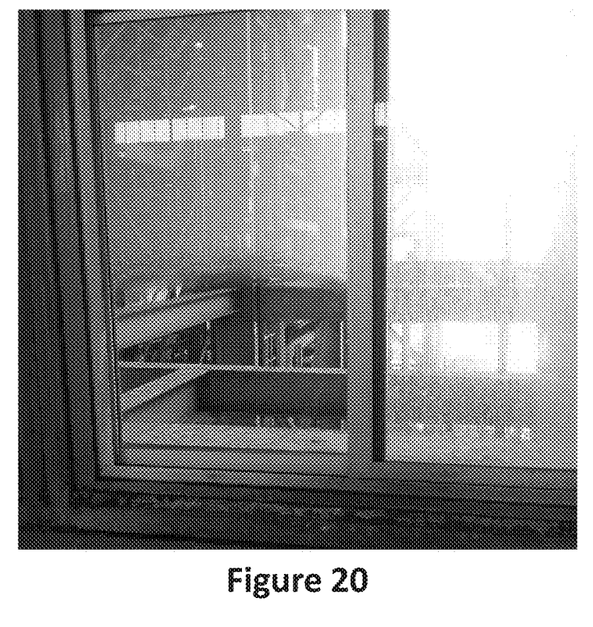
FIG. 20. Shows a photograph with a front view of a glass window subsequent to the application of the formulation object of the present invention.
Figure 21:
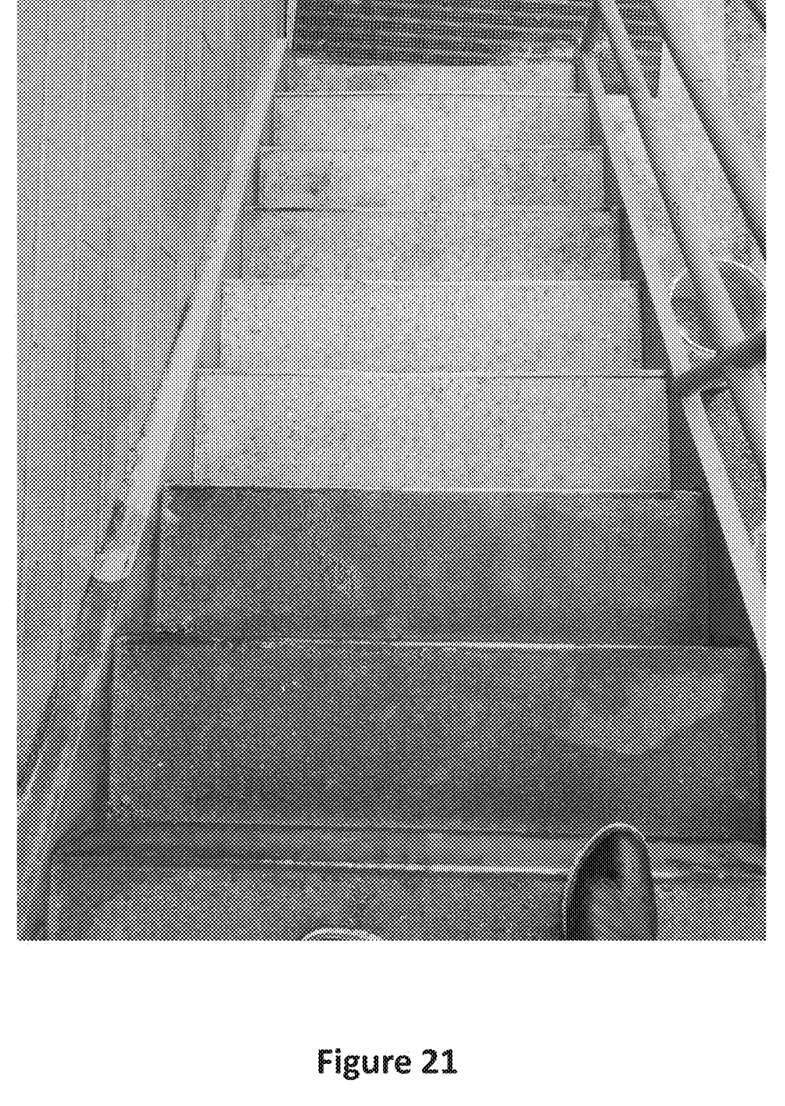
FIG. 21. Shows a top view of a concrete staircase, where the steps prior to the application of the formulation appear at the bottom and the steps already cleaned at the top once the formulation was applied.

The invention may be applied to steel, aluminum, metal, foil, and copper, as shown in FIGS. 17 and 18; additionally on surfaces painted with alkylidic, epoxy, and polyurethane enamels of any color, as shown in FIG. 9 and FIG. 10, also removes the paint heated by ultraviolet rays, maintaining the original color, as shown in FIG. 15 and FIG. 16, without the need to sand the surface or applying sand blasting. In the same way, in paint application processes or when it is required to remove stains from ferrous oxide, commonly called orange runoff, as shown in FIG. 11 and FIG. 13, it allows for a clean surface, shown in FIG. 12 and FIG. 14, and ready for the application of an anticorrosive background or paint, depending on each case; likewise with the present invention it is possible to clean glass stained by weather and hard water, as seen in FIGS. 19 and 20, as well as quarry, brick, stone, and various types of floors, such as concrete floors, shown in FIG. 21.

The biodegradable formulation object of the present invention comprises hydrochloric acid from 5 to 22.5%, phosphoric acid from 10 to 40%, ammonium bifluoride 1.2 to 12%, butyl cellosolve from 1 to 12%, NF 1000 from 0.5 to 13%, 10M ethoxylated lauric alcohol from 1 to 12%, xanthan gum from 1 to 12% and at least 20% of water; or optionally it comprises 0.001 g/l of a dye; where it preferably comprises 14% hydrochloric acid, 18% phosphoric acid, 3% ammonium bifluoride, 4.5% butyl cellosolve, 3.5% NF 1000, 2% 10 M ethoxylated lauric alcohol, 0.5% xanthan gum and at least 20% water.

Example 1. Process of Obtaining the Formulation

To prepare the formulation, water is added with at least one corrosion inhibitor and with ammonium bifluoride and it is kept in agitation, to later add hydrochloric acid and phosphoric acid to obtain a primary mixture.

Independently, at least one organic solvent is mixed with 10M lauric alcohol, betaine, and sodium lauryl ether sulfate. It is kept stirring until a homogeneous mixture is obtained, said homogeneous mixture is added to the primary mixture maintaining constant agitation. Finally add the thickener and color.

Example 2. Preferred Form of Application of the Invention

Once the surface where the formulation is to be applied is identified, it is applied by means of spraying, and with the help of a soft plastic bristle brush it is distributed evenly on the surface, leaving the formulation to act at least 2 minutes or until some type of reaction is visually identified on the surface, to then rinsed with pressurized water and finally dried.

Example 3. Evaluation of Chemical Oxygen Demand

Once the biochemical oxygen demand test was performed, after 5 days it is considered fully biodegradable under normal conditions when the percentage of biodegradation is greater than 60% of the BOD5 estimated from the chemical oxygen demand and the BOD5 measured. Said test was carried out at the Faculty of Chemical Sciences of the Autonomous University of Nuevo Leon and its results are shown in Table 1:

TABLE 1

| Results of chemical oxygen demand | |
|---|---|
| Chemical oxygen demand (mg/gr mta) | 119.70 |
| Estimated biochemical oxygen demand (mgO2/gr mta) | 39.90 |

TABLE 1-continued

| Results of chemical oxygen demand | |
|---|---|
| Biochemical measured oxygen demand (mgO2/gr mta) | 37.25 |
| Biodegradability % | 93.36 |

Having sufficiently described my invention, I consider as a novelty and therefore claim as my exclusive property, the content of the following clauses:

1. A biodegradable formulation comprising:
   a) from 5 to 22.5% hydrochloric acid;
   b) from 10 to 40% phosphoric acid;
   c) from 1.2 to 12% ammonium bifluoride;
   d) from 1 to 12% butyl cellosolve;
   e) from 1 to 12% ethoxylated lauryl alcohol;
   f) from 1 to 12% xanthan gum; and
   g) at least 20% water.

2. The biodegradable formulation according to claim 1, wherein the formulation comprises 14% hydrochloric acid, 18% phosphoric acid, 3% ammonium bifluoride, 4.5% butyl cellosolve, 2% ethoxylated lauryl alcohol, 1% xanthan gum and at least 20% water.

3. The biodegradable formulation, according to claim 1, optionally including at least one colorant.

4. The biodegradable formulation, according to claim 3, wherein the colorant is present in 0.001 g/l.

5. A method for restoring a surface by using the biodegradable formulation according to claim 1.

* * * * *